(12) United States Patent
Hiller

(10) Patent No.: US 7,251,575 B2
(45) Date of Patent: Jul. 31, 2007

(54) POSITION MEASURING METHOD AND POSITION MEASURING SYSTEM USED IN THE MULTIPLICATION OF SIGNAL PERIODS

(75) Inventor: Bernhard Hiller, Berlin (DE)

(73) Assignee: Hubner Electromaschinen GmbH, Berlin (DE)

( * ) Notice: Subject to any disclaimer, the term of this patent is extended or adjusted under 35 U.S.C. 154(b) by 0 days.

(21) Appl. No.: 10/538,867

(22) PCT Filed: Dec. 18, 2003

(86) PCT No.: PCT/DE03/04213

§ 371 (c)(1),
(2), (4) Date: Jun. 14, 2005

(87) PCT Pub. No.: WO2004/085971

PCT Pub. Date: Oct. 7, 2004

(65) Prior Publication Data

US 2006/0052973 A1    Mar. 9, 2006

(30) Foreign Application Priority Data

Mar. 25, 2003   (DE) ................................ 103 13 518

(51) Int. Cl.
*G01C 17/00* (2006.01)

(52) U.S. Cl. ........................................................ 702/94

(58) Field of Classification Search .................. 702/94
See application file for complete search history.

(56) References Cited

U.S. PATENT DOCUMENTS

| 6,097,318 | A * | 8/2000 | Hagl et al. ..................... 341/7 |
| 6,265,992 | B1 | 7/2001 | Hagl et al. |
| 2005/0052179 | A1* | 3/2005 | Herzer ................... 324/207.24 |

FOREIGN PATENT DOCUMENTS

| EP | 0328683 | 8/1989 |
| EP | 0552726 | 7/1993 |

\* cited by examiner

*Primary Examiner*—John Barlow
*Assistant Examiner*—Cindy D. Khuu
(74) *Attorney, Agent, or Firm*—Mark P. Stone

(57) ABSTRACT

The invention relates to a position measuring device and a position measuring system (1) that are used to process signals (SIN, COS), which represent the displacement (8) of a scale gradation (4) relative to a signal generation unit (7). To increase the resolution of the signals (SIN, COS), output signals (SIN', COS'), which have a higher frequency or multiplied number of signal periods in relation to the input signals (SIN, COS), are generated by the device (1). This enables evaluation units (3) that are connected downstream to record the position and speed of the scale gradation (4) more accurately. The number of signal periods is increased by the calculation of a position signal (POS) with a subsequent filtration or error correction from the input signals (SIN, COS) and by the reading of stored tables of output tables of output signals (SIN', COS') in accordance with the calculated position signal (POS).

48 Claims, 4 Drawing Sheets

POSITION MEASURING METHOD AND POSITION MEASURING SYSTEM USED IN THE MULTIPLICATION OF SIGNAL PERIODS

TECHNICAL FIELD

The invention relates to a position measurement method and a position measurement system, by means of which the number of signal periods of a sine and cosine signal which represent a position can be multiplied.

PRIOR ART

Position measurement systems are normally used for position, orientation and angle determination. In machine tools by way of example, it must be possible to measure the position and orientation of the tool relative to the workpiece precisely in order to achieve high manufacturing precision levels. Normally, a position measurement system has a scale subdivision and a signal generation unit, by means of which the movement of the scale subdivision relative to the signal generation unit is determined and a signal which represents the relative movement is emitted. A signal such as this may, for example, be in the form of a square-wave signal with a time sequence of pulses (high-low signal) with a pulse in each case being emitted when the scale subdivision has moved through a predetermined movement distance relative to the signal generation unit. For this purpose, markings can be applied at predetermined intervals to the scale subdivision, which are detected by the signal generation unit and as a function of which a pulse is emitted.

Position measurement systems may detect either a rotary movement or a translational movement. Rotary movements are measured by rotary encoders, and translational movements are measured by length measurement systems. Absolute position measurement systems indicate in the signal the actual, absolute position and orientation of the scale subdivision with respect to the signal generation unit, while incremental position measurement systems indicate only the relative change in position and orientation with respect to an initial position.

In the case of rotary encoders, a predetermined number of high-low signals are normally emitted per entire revolution, for example 1024 or 3600 high-low signals. In the case of length measurement systems, a specific number of high-low signals are produced per length unit, for example 10 high-low signals per millimeter.

The rotation speed or the relative speed of the scale subdivision with respect to the signal generation unit can then easily be calculated from the number of high-low signals per unit time.

The position measurement systems can produce the high-low signals optically, magnetically, inductively or capacitively, with optical systems being excellent owing to their high resolution and precision.

In the case of optical systems, by way of example, the light from a light-emitting diode passes through a so-called mask which is fitted at a short distance, typically of 0.1 mm, above the scale subdivision, for example an incremental disk or a length scale. The scale subdivision is provided with transparent and non-transparent markings at regular intervals. When the scale subdivision is moved with respect to the mask in the course of the movement to be detected, regular light/dark areas are formed. These are scanned photo-electrically by means of a sensor, resulting in a position signal similar to a sine wave, which can easily be converted to the high-low pulses as described above, for example by means of comparators.

A second signal, which is similar to a cosine wave and is phase-shifted through 90°, is also produced, in addition to the first signal, which is similar to a sine wave, by appropriate arrangement of further photo-electric sensors. This makes it possible to detect the movement direction. The advantage of the sine and cosine signals is that they allow considerably better position resolution than in the case of square-wave signals by means of evaluation of the signal amplitude, in comparison to the frequently used high-low pulses. However, this procedure requires more complex signal processing.

However, in the evaluation of the sine and cosine signals, care must be taken to ensure that their frequencies can still be detected by the downstream evaluation electronics. In order to reduce the frequencies of incoming high-frequency sine and cosine signals from optical position measurement systems, and to allow them to be processed subsequently, systems are known from the prior art which make the resolution of the position signals coarser. This is achieved electronically by the apparatuses and methods in EP 0 872 714 A1, DE 198 15 438 A1, U.S. Pat. No. 6,097,318 and U.S. Pat. No. 6,265,992 B1.

In some applications, the mechanical boundary conditions to which position measurement systems operating on the basis of optical scanning principles are subject cannot be achieved, for example the short separation of typically 0.1 mm, so that other scanning methods are used there. Furthermore, optical systems may not be used in many cases, for example when using position measurement systems in wood processing machines, where the chippings and the wood dust impede optical scanning, despite appropriate encapsulation. Magnetic and inductive scanning are not affected in this case.

In the case of a magnetic scanning method, the scale subdivision comprises periodically alternately magnetized markings. The distance between the markings on the scale subdivision in this case varies in the millimetric range, so that, based on a rule of thumb, the distance between the signal generation unit and the scale subdivision may be in this magnitude range. Magnetic methods thus allow a greater distance, and in particular a greater distance variation between the signal generation unit and the scale subdivision. The sensor, for example based on the magnetoresistive principle, then once again produces a signal which is similar to a sine wave and a cosine wave, depending on the magnetic marking.

Owing to the coarser embodiment, magnetic and inductive position measurement systems emit considerably fewer signals per revolution or per length unit. In order to make it possible to achieve high position resolution despite this, the quality of the signals produced by a position measurement system is subject to stringent requirements: the amplitude of these signals must be as identical as possible, the signals should not have any signal offset, they should have as perfect a sinusoidal shape as possible, they should not have any noise components and they should be shifted in phase with respect to one another by as close to 90 degrees as possible. In addition, the evaluation unit which processes the sine and cosine signals must also not have any such errors or other errors since, otherwise, the position can be determined only with errors.

Since the freedom from errors in the signals from the measurement system and the evaluation unit which is a normal component of a servo regulator or control system cannot be ensured in practice, or can be ensured only inadequately in practice, it would be desirable to produce high-quality signals, similar to a sine wave, with a greater number of signal periods per distance element or angle element, by appropriate signal processing from relatively coarse signals which are similar to sine waves. The errors from the evaluation units that are normally used are then far less important.

The prior art describes methods to increase the signal frequency, or to multiply the signal period, in EP 0 552 726 B1 and in EP 1 236 973 A2.

In the method and the apparatus in EP 0 552 726 B1, the input sine signal and the input cosine signal are multiplicatively and additively linked to one another in such a way that the frequency of these signals is increased by implementation of trigonometric formulae. In this case, the formula calculations are carried out on the analog signals. However, this requires complex circuits, which themselves in turn produce errors.

In EP 1 236 973 A2, the relative phase angle of the sine signal and cosine signal is used to produce square-wave signals at a higher frequency. The disadvantage of this apparatus is that the square-wave signals which are produced allow only comparatively poor position resolution, and the maximum rate of movement or rotation speed is restricted by the very high frequencies of the square-wave signals which then occur.

DESCRIPTION OF THE INVENTION

Bearing in mind the disadvantages of the methods which are known from the prior art for multiplication of a signal period, the invention is thus based on the object of providing a position measurement method and a position measurement apparatus which multiply the number of signal periods in signals from position and angle measurement systems in a manner which is robust with respect to errors.

In the case of the position measurement method according to the invention for signal period multiplication, this object is achieved in that a position signal is calculated from an input sine signal and an input cosine signal, and wherein an output sine signal and an output cosine signal, each having a number of signal periods corresponding to a single signal period of the input signals, are emitted as a function of the position signal. In the position measurement system according to the invention, the position signal is calculated in a calculation unit, and the output signals are produced in a signal generation unit.

This solution makes it possible to increase the resolution of the position measurement method and of the position measurement system in a simple manner. The formation of the position signal from the input sine signal and from the input cosine signal makes it possible to easily eliminate errors which are contained in each case in only one of the two input signals, so that they are not included in the output signals. This makes it possible to improve the accuracy of the output sine signal and the output cosine signal, which are formed as a function of the position signal.

This simple solution can be improved further by the following refinements relating to its accuracy and robustness with respect to errors. The individual refinements may in this case each be combined independently of one another.

The position signal is preferably formed from the arctan (atan) of the quotient of the input sine signal and the input cosine signal. The atan can be determined by reading from a look-up table or, for example, can be calculated by means of the so-called cordic algorithm. In addition, other methods may also be used. For example, so-called hunting methods are also suitable.

The calculation of the atan of the quotient of the input sine signal and the input cosine signal offers the considerable advantage that simultaneous amplitude fluctuations in the input signals do not lead to errors in the position value calculated from them. Many other methods do not make it possible to ensure this.

The resolution of the position value determined in this way can be improved using a fast digital filter, in which case relatively high-frequency disturbances can be suppressed at the same time by the digital filter. In this case, improving the resolution should be understood as meaning a representation of the position value with a greater number of data bits.

Thus, in one advantageous refinement, two output tables can be provided in a memory in the apparatus or in the signal generator, which are each associated with one output signal and are addressed and read in parallel. This measure makes it possible to ensure in-phase production of the output signals and high phase trueness in a simple manner, even at very high reading frequencies.

The increase in frequency in the two output signals can be carried out reliably by the high-resolution calculation of the position signal, which represents the profile of the position and attitude of the measurement means over time as a digital value. In order to minimize the calculation complexity, the output tables may be stored in the at least one output table, so that these tables just have to be read. However, of course, it is also possible to calculate a sine signal and a cosine signal from the high-resolution position value, using the signal generator.

In one particularly advantageous refinement, the high-resolution instantaneous value of the position signal may be emitted in the form of a digital k word, that is to say a digital number of k bits, with only m successive bits being read from the k word, where (m<k), for integer positive, and otherwise any desired, values of k and m. The output sine signal and the output cosine signal are produced as a function of the m word which is read from the longer k word, preferably by the output table being addressed by the m word.

The advantage of this refinement is that the frequency multiplication can be adjusted in a manner that is very simple to implement by the position of the m word within the k word: this is because, surprisingly, it has been found that a frequency increase by the factor $2^{(k-k_m)}$ is obtained between the input signals and the output signals when the most significant bit in the m word is at the position $k_m$, $k_m \leq k$. The signal sequence which is formed from the m word varies with this increased periodicity with respect to the periodicity of the position signal.

A number of further advantageous refinements deal with the conditioning of the input signals in order to allow the position signal to be calculated as accurately as possible. This prevents the errors in the input signals being included to an increased extent in the output signals with a multiplied signal period. All of these filtering processes before the actual frequency increase are carried out in a signal conditioning unit.

Thus, in one embodiment, a signal conditioning unit can be provided which allows discrepancies in the input sine and input cosine from the nominal form to be calculated, and to be fed back to the input sine and the input cosine in order to regulate out these discrepancies. Fundamentally, the feedback conditioning of the input signals may be carried out before and/or after they are digitized, by means of analog/ digital converters, that is to say the signal conditioning may be carried out purely in an analog form, purely in a digital form, or in a mixed analog and digital form. Owing to the simplicity of the design, it is preferable to regulate out the already digitized input signals.

The error correction during the conditioning process may comprise the detection of discrepancies between the amplitude of the input sine and the amplitude of the input cosine, and regulating out any amplitude differences, or the regulation of the two signal amplitudes at the same nominal value. Signal offsets, that is to say discrepancies between the mean value of the input sine signal and the input cosine signal, calculated over one or more periods, and a nominal mean value, for example a predetermined null position, can be calculated and regulated out in a similar manner. The relative phase angle of the input sine signal with respect to the input cosine signal can also be detected in the course of the signal conditioning process, and discrepancies from the nominal phase angle of 90° can be compensated for, in particular, by mutual addition of a part of the respective other input signal. These steps can be carried out in the interpolation unit.

Furthermore, the signal conditioning unit may have a digital filter, in particular a low-pass filter, in each case for the input sine signal and the input cosine signal, which have already been digitized at a high sampling rate which reduces high-frequency disturbances and noise components, caused by way of example by frequency converters, thus improving the quality of the digitized input signals. The cut-off frequency of this digital filter, which may be of widely different types, but is preferably in the form of a digital mean-value filter that is simple to implement, may be set such that, even at the maximum movement speed or rotation speed, it is below the frequency of the input signals which occurs in this case.

Independently of the preconditioning process, a further processing step may be provided in further intrinsically advantageous refinements, by means of which error components are filtered out which are intrinsic to the signal source. According to one advantageous refinement, such preferably digital filtering is carried out only after the calculation of the digital position signal. This allows the computation complexity to be reduced in comparison to filtering of each of the two input signals.

In this case, the error components, which are dependent on the measurement system and on the environmental conditions, may, for example, be filtered out by comparing the position signal calculated from the input signals, which may also be preprocessed as described above, with previously stored error characteristics. In particular, different characteristics may be stored for different errors that are typical of the measurement system. If the position signal matches a previously determined error characteristic or two or more previously determined error characteristics, then the error which is dependent on the signal transmitter can be eliminated from the position signal by means of predetermined algorithms, which are defined as a function of this error characteristic, or by the use of previously stored look-up tables.

In order to produce the previously stored error characteristics and the associated elimination algorithms and/or look-up tables, the measurement systems are investigated experimentally for system-dependent errors. By way of example, depending on the errors which are discovered during these investigations, look-up tables are generated, which contain values which take account of these errors and thus correct the erroneous values.

The error components and, in particular, noise components which are dependent on the measurement system and occur in the position signal (including quantization noise) can be filtered out by means of one or more digital filters, for example digital low-pass filters. However, the cut-off frequency of the low-pass filters must be higher than the frequency which is relevant for the downstream control process.

In particular, it is possible to filter out the transmitter-dependent error signals by forming a sliding mean value from the digital position signal, over two or more values which follow one another at short time intervals. This measure makes it possible to filter out high-frequency noise components.

A further advantage of the formation of a sliding mean value is that the mean value can be stated with a resolution which is better than the resolution of the individual values to be averaged. If, for example, the mean value is formed from two or more position signals which follow one another at a short time interval, and each have a resolution of i bits, then the calculated mean value can have a resolution of k bits, where k is greater than i.

The output, sine and cosine signal is then produced in the signal generation unit as a function of the position signal from which the error and noise components which are dependent on the signal transmitter have been removed in the signal conditioning unit and, possibly, in the digital filter, in particular as a function of the high-resolution position signal calculated by averaging. In particular, as mentioned above, the position signal can be used for addressing the output tables for the output sine and the output cosine.

If an averaging process has been carried out in order to filter out the error components which are dependent on the signal transmitter, it is then possible, in order to further improve the accuracy of the calculation of the position signal, in one advantageous development, to compensate for the time delay that occurs as a result of the averaging process. When the time delay is compensated for in this way, the mean value is corrected as a function of the previous signal profile and as a function of the number of support points included in the mean value, in order to come as close as possible to the actual instantaneous value.

The output sine signal and the output cosine signal which, as mentioned above, are each at a higher frequency than the input sine signal and the input cosine signal, respectively, can, finally, be converted by means of a digital/analog converter to analog signals, and can be passed as analog signals to an evaluation unit, which is normally located in the control assembly or the controller.

In parallel with the processing of the input signals, that is to say the input sine signal and the input cosine signal, the phase angle and the pulse duration of the reference signals can also be matched to the increased number of signal periods.

The invention will be explained in the following text using one embodiment by way of example, and with reference to the drawings. On the basis of the possible embodiment variants described above, individual features of the described embodiment may in this case be added or omitted, or may be combined, independently of one another.

APPROACHES TO IMPLEMENTATION OF THE INVENTION

Figure 1:
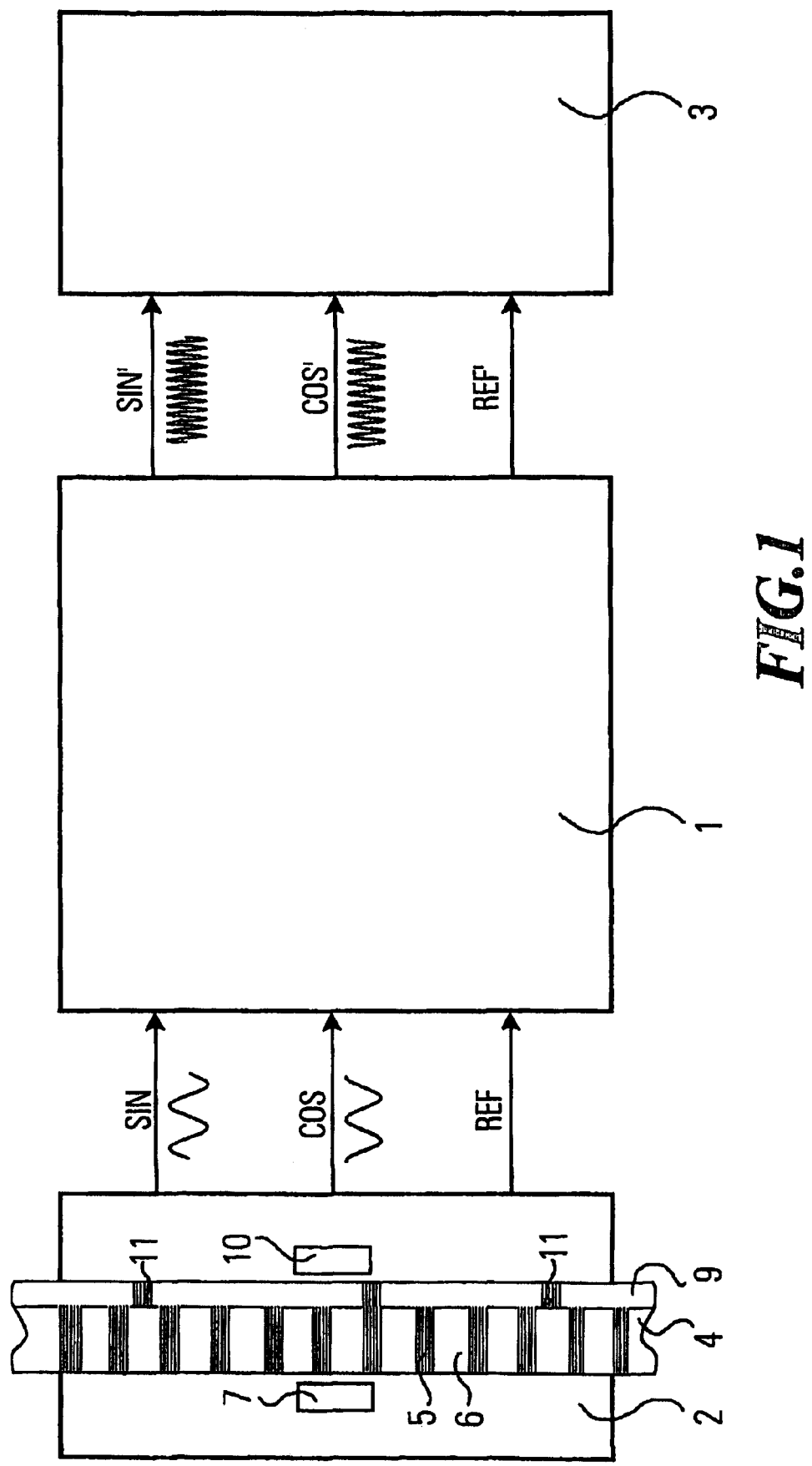
FIG. 1 shows a schematic block diagram of an apparatus according to the invention for signal period multiplication using a position measurement device.

FIG. 1 shows the system according to the invention for multiplication of the signal period, schematically in the form of a function block 1 between a position measurement means 2 and an evaluation unit 3.

The position measurement means 2 has a scale subdivision 4 which is provided at regular intervals with markings 5, 6, and has a position sensor 7 which can move relative to this. The scale subdivision 4 is scanned by the position sensor 7. The position measurement means or the signal transmitter 2 provides an input sine signal SIN and an input cosine signal COS to the system 1.

In the case of an optical signal transmitter, the markings 5, 6 may represent light/dark areas or transparent and non-transparent areas; if it operates magnetically, the markings 5, 6 are areas which are differently magnetized. Other functional principles are likewise possible, such as inductive and capacitive principles. All principles have the common feature that, when a relative movement takes place between the scale subdivision 4 and the position sensor 7, the position measurement means 2 produces periodically modulated, analog incremental signals SIN and COS. These incremental signals provide both the position information with respect to the relative position and orientation of the scale subdivision 4 and the position sensor 7, as well as the corresponding information relating to the movement direction.

The exemplary embodiment of FIG. 1 shows a position measurement means 2 which detects a linear relative movement by means of a linear scale subdivision 4. Alternatively, a scale subdivision 4 may also be provided which detects a rotational movement. In this case, a scale subdivision in the form of a disk is used, rather than the linear scale subdivision 4 as illustrated in FIG. 1. In this case, the scanning principle remains essentially the same.

In addition to the signals SIN and COS, a reference signal REF can be provided from a sensor 10 over one or more markings 9. The reference signal REF is used to mark one or more predefined positions 11 as reference positions.

The signals SIN, COS and REF are supplied to the system 1, which uses the input signals to produce modified output signals SIN', COS' and REF'. In this case, the output signals SIN' and COS' have a greater number of periods than the input signals SIN and COS, that is to say they are at a higher frequency. The signal REF' is appropriately adapted by the apparatus 1.

The increased number of periods allows the output signals SIN' and COS' to resolve the position and orientation of the position measurement means 4 to a better extent by the factor of the multiplication of the number of periods, in comparison to the input signals SIN and COS. It is thus possible to provide more accurate open-loop and closed-loop control for the drives, axles and positioning devices and the like, which are not shown in FIG. 1 but to which the position measurement system is fitted.

Figure 2:
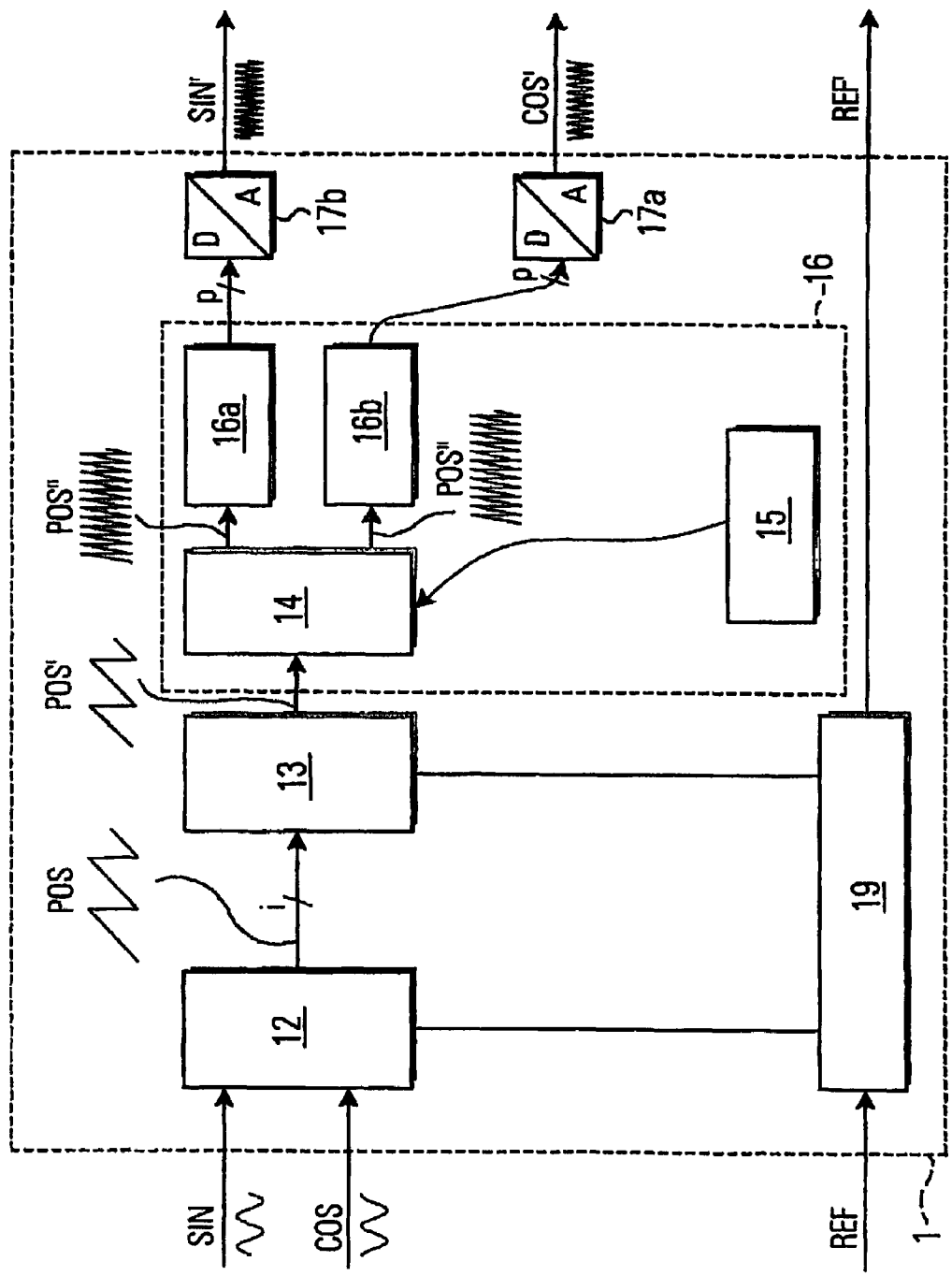
FIG. 2 shows a schematic block diagram with details of the design of the apparatus for signal period multiplication as shown in FIG. 1.

FIG. 2 shows, schematically, the design of one embodiment of the apparatus 1 shown in FIG. 1.

The input signals SIN and COS are first of all supplied to an interpolation unit 12, where they are digitized, the errors are corrected and they are converted to a position signal POS, which is representative of the position of the measurement means and has a resolution of i bits. By way of example, the position signal POS may have a resolution of (i=10) bits. The change in the position or orientation of the scale subdivision 4 relative to the signal generation unit 7 is modeled in the position signal POS. In this case, constant movement in one direction results in sawtooth signal waveforms.

The position signal POS is then passed to a digital filter 13, where various types of errors are filtered out and the filtering compensates for any signal delays that have occurred. In particular, the filter 13 compensates for disturbance and noise components in the position signal POS, caused by corresponding noise and disturbance components in the input signals which are intrinsic to the position measurement system 2 by virtue of its design. Furthermore, the resolution of the position signal is improved. The filtering results in a corrected, high-resolution position value POS', which is stored in a register 14.

Figure 3:
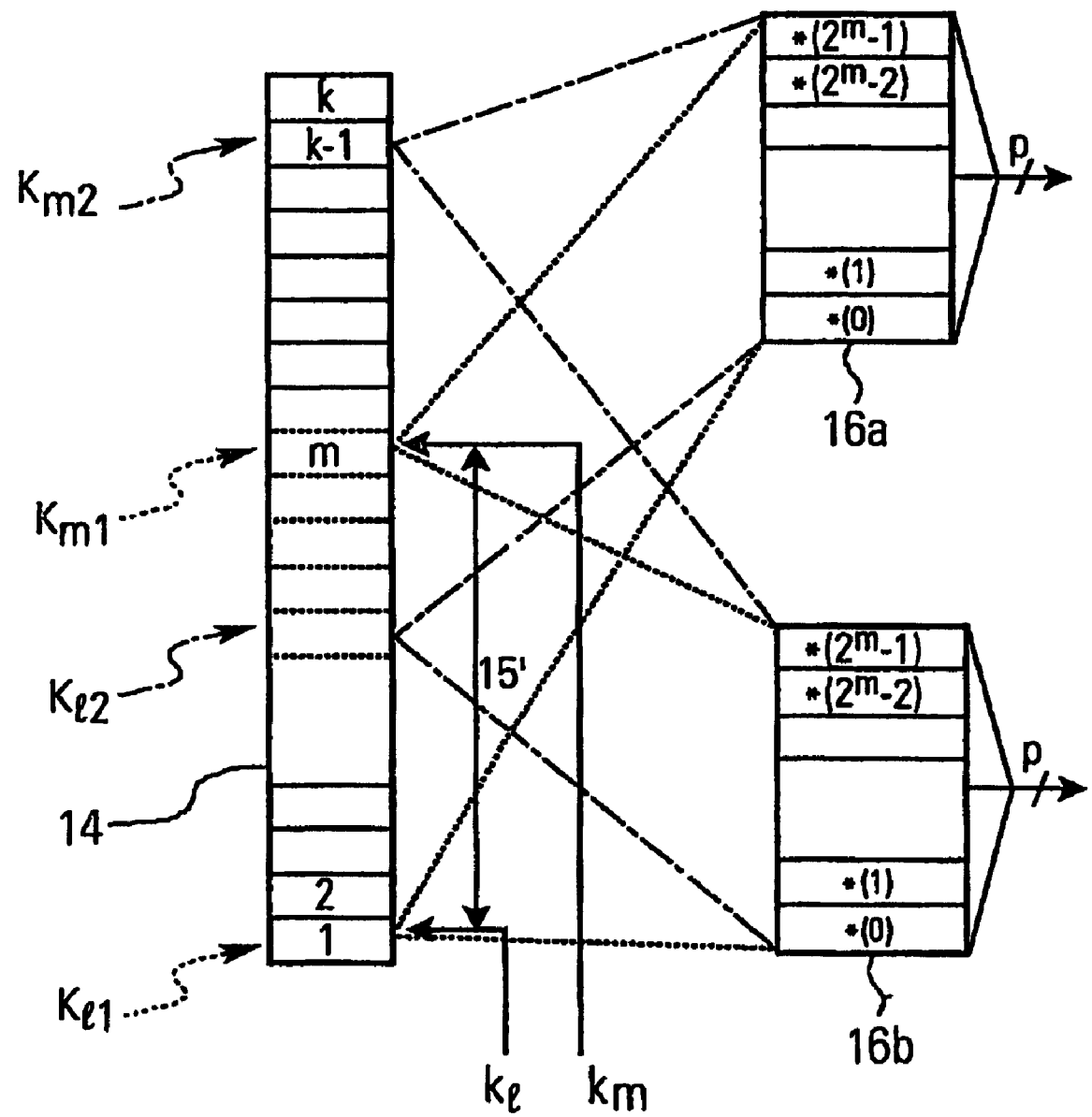
FIG. 3 shows a schematic illustration of the design and operation of one embodiment of a signal generator as shown in FIG. 2.

The corrected position value POS' is, as is illustrated in FIG. 3, stored in the register 14 as a digital value comprising k bits, referred to in the following text as the k word, preferably in an integer format. Since the correction algorithms in the digital filter 13 improve the accuracy of the corrected position signal POS' with respect to the position signal POS from the interpolation unit, the relationship (k>i) is satisfied.

In the next step, the frequency increase or the period multiplication is carried out in the signal generator in the system 1, as will be explained in more detail in the following text.

A read unit 15 reads m associated successive bits, referred to in the following text as the m word, from the k word in the register 14, preferably using at least the same clock rate that is used to update the high-resolution position value POS' in the register 14.

The value of the m word changes periodically at a higher frequency than the value of the k word when the most significant bit of the m word does not coincide with the most significant bit of the k word:

The position of the m word read from the k word is governed by the position $k_m$ of its most significant bit m. The least significant bit in the m word is in this case in the $k_1$ position in the k word, with the relationship $(k_m - k_1 = m)$ being satisfied.

If the position of the m word in the k word is chosen such that the relationship $(k_m < k)$ is satisfied, then the frequency at which the m word that is read varies is increased by the factor $2^{(k-km)}$ with respect to the frequency at which the sawtooth-like position signal POS' varies during constant relative movement of the scale subdivision and signal generation unit. The increased number of signal periods in the m word is illustrated schematically in FIG. 2, by the signal POS''. In other words, if the frequency of the position signal POS', which in particular may correspond to the frequency of the input signals SIN and COS, has a value $f_{p'}$ and the frequency of the increased-frequency position signal POS'' has a value $f_{p''}$, then the factor n of the frequency increase is given by:

$$n = (f_{p''}/f_{p'}) = 2^{(k-km)} \qquad (1)$$

As can be seen from the formula (1), the signal frequency of the signal POS" is governed by the position of the m word within the k word. In order to explain this relationship, FIG. 3 shows two differently positioned m words within the k word, which each lead to different frequencies.

The first m word starts at the position ($k_{11}$=1) and ends at the position ($k_{m1}$=m). Thus, in this variant, the m least significant bits of the k word are read. The signal period with which the bit $k_{m1}$ in the k word varies and which thus governs the signal period of the m word is in this case $2^{(k-km1)}$ times, that is to say $2^{(k-m)}$ times, the signal period of the k word. Since, in this position of the m word, the difference ($k-k_{m1}$) for a given m and k is a maximum, this represents the maximum possible period multiplication.

In the second case, the m word extends within the k word from the initial position at the bit $k_{12}$ to the bit $k_{m2}$=(k−1). In this case, signal period multiplication by the factor $2^{(k-km2)}=2^{[k-(k-1)]}=2^{1}=2$ is possible. Frequency doubling is thus achieved in this case.

If the most significant bit in the m word, that is to say $k_m$, coincides with the most significant bit in the k word, that is to say k, then the signal period of the m word corresponds to the signal period of the k word. In this case, all that is carried out by the apparatus 1 is error correction by the interpolation unit 12 and the digital filter 13.

The frequency increasing method described above allows a variable frequency increase in a manner which is simple to implement: frequency multiplications can be achieved in steps of powers of two between 2 and $2^{(k-m)}$ by simple bit shifting, indicated by the double-headed arrow 15' in FIG. 2, of the m word within the k word. The shifting of the m word within the k word can be carried out by simple bit masking and bit shifting by the read unit 15.

The output sine signal SIN' is produced as a function of the m word by a sine generation device 16a, and the output cosine signal COS' is produced by a cosine generation device 16b. To do this, by way of example, the m word is used by the read unit to address output signal tables 16a, 16b in the sine and cosine generation device, respectively, which are stored in a volatile or non-volatile memory in the apparatus 1. By way of example, the table 16b contains the successive digital values of a cosine signal COS' with a resolution of p bits in the form of a one-dimensional field, or a field which can be addressed one-dimensionally. The bit resolution p of the output signal COS' is independent of the bit resolution i of the input signal COS or of the bit resolution k of the position signal POS". The output signal table 16b contains an output sine signal SIN', in a corresponding manner.

In addition, only a single table 16 (not shown) may be used, of course, owing to the phase shift between the sine and cosine function. In this variant, the table for production of the SIN' and of the COS' signal is read at two positions which are at a constant distance from one another. Taking account of the read frequency, this distance corresponds precisely to the phase offset of 90° between the sine and cosine. It is likewise feasible to use a calculation algorithm rather than using the table 16 or the tables 16a and 16b to produce the SIN' and COS' signals. The cordic algorithm can preferably be used for this purpose.

The register 14, the sine generation device 16a and the cosine generation device 16b as well as, in an appropriate embodiment, the read or addressing unit 15 can be functionally combined to form a signal generation unit 16, which produces the output signals as a function of the position signal.

Each of the two output tables 16a, 16b has a total of $2^m$ tabled sine and cosine values corresponding to the value range of the m word, and preferably reflects the complete profile of one period of the respective sine or cosine signal. In consequence, the period of the respective sine and cosine signal SIN' and COS' in the tables 16a, 16b is resolved with $2^m$ successive support points, each comprising p bits.

The value of the m word is used to address the output tables 16a, 16b. This is shown in FIG. 3 by the representation of the value of the m word that has been read in the form *("value of the m word"). If the m word that has been read has the numerical value 0, for example, then the value located at the position 0 in the two output tables 16a, 16b will be read. This value is represented symbolically by *(0) in FIG. 3. As a maximum, the m word can assume the value ($2^m-1$), specifically when all of the bits in the m word are set to 1. In this case, the last value in the respective table 16a, 16b is read at the position ($2^m-1$). This value is shown symbolically in FIG. 3 by *($2^m-1$).

The values which are in each case read from the output table 16a, 16b are, finally, supplied to a respective digital/analog converter 17a, 17b which converts them to analog signals. The analog signals are then passed out of the apparatus 1. Prior to this, they can be set to standardized signal levels by means of amplifier circuits, which are not shown in FIG. 2, and can be smoothed by means of filters, which are likewise not illustrated. In the same way, instead of the digital/analog converters, a pulse pattern (PWM) which corresponds to the values in the output tables 16a and 16b can be emitted, which is produced at a high frequency and, filtered by means of a low-pass filter, produces the signals SIN' and COS'.

Finally, the apparatus 1 contains a unit 19 by means of which the reference signal REF is matched to the modified signals SIN' and COS'. The reference signal REF' is newly synthesized by the unit 19 such that it occurs only in those quadrants of the signals SIN' and COS' which correspond to the position of the original quadrants of the signal REF in the input signals SIN and COS. For this purpose, the unit 19 uses the position value POS' which has been interpolated by the interpolation unit 12 and has been filtered by the digital filter 13.

The design and operation of one embodiment of the interpolation unit 12 and of the digital filter 13 will now be explained with reference to FIG. 4. The interpolation unit 12 and the digital filter 13 are a functional part of a position finding unit 20, by means of which the corrected and high-resolution position signal POS' is produced, whose signal period still corresponds to the signal period of the input signals SIN and COS, but whose resolution has been increased by k bits.

The analog input signals SIN and COS are supplied from the position measurement system 2 to the interpolation unit 12, where they are separately digitized in an input interface 21 by a respective analog/digital converter 22a, 22b, and are then supplied in digital form to a signal conditioning unit 23.

Instead of the two separate lines for the sine input signal SIN and the cosine input signal COS, it is also possible to provide a single data line, in which case the input signals SIN and COS can then be processed using a multiplexing method. The signals SIN and COS may likewise already be in digital form, so that there is no need for the analog/digital converters 22a, 22b.

The signal conditioning unit 23 is used to improve the signal quality of the input signals SIN and COS before further processing. The signal conditioning unit 23 calculates discrepancies from the nominal states of the input signals SIN and COS, and corrects the input signals SIN and COS.

In particular, the interpolation unit 12 may have the functions as described in Kirchberger, R., and Hiller, B., "*Oversamplingverfahren zur Verbesserung der Erfassung von Lage und Drehzahl an elektrischen Antrieben mit inkrementellem Gebersystem*" [Oversampling methods for improving the detection of the position, orientation and rotation speed of electrical drives using an incremental transmitter system], in: SPS/IPC/Drives, Nuremberg 1999, Conf.-rec. pp. 598-606.

By way of example, the signal conditioning unit 23 in each case calculates the signal offsets, that is to say for example the mean values of the input signals SIN and COS over a predetermined time period, and corrects them via the compensation units 24a, 24b if there is any discrepancy from their nominal value. The adjustment process is carried out separately for each input signal SIN and COS. The adjustment process is illustrated schematically in FIG. 3 by the dotted arrows 25a, 25b.

Figure 4:
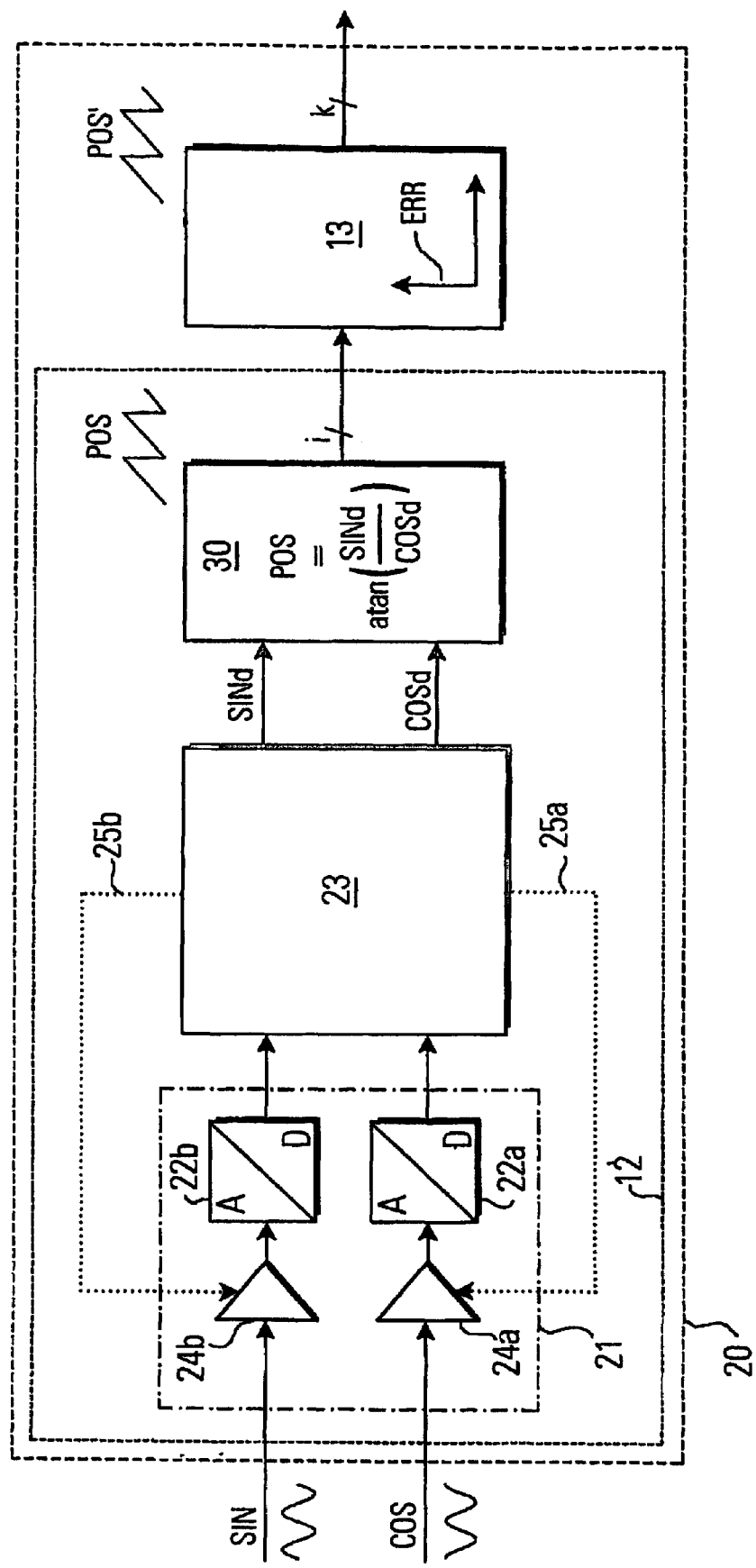
FIG. 4 shows a schematic block diagram with details of the design of a position finding unit for the apparatus as shown in FIG. 2.

In the embodiment shown in FIG. 4, the compensation units 24a, 24b are shown in the analog signal path for SIN and COS, respectively. Offset correction can, of course, also be carried out on the already digitized signals SIN and COS.

The signal conditioning unit 23 also determines the relative signal amplitudes of the input sine signal SIN and of the input cosine signal COS. In the ideal state, the two input signals SIN and COS have the same amplitude. Discrepancies in the amplitude of the actually existing signals SIN and COS are likewise regulated out by feedback from the compensation units 24a, 24b.

Furthermore, the signal conditioning unit 23 can detect phase errors in the input signals SIN and COS, and can correct them via the compensation units 24a, 24b. Input signals SIN and COS which do not have exactly sinusoidal waveforms can be corrected by means of a correction table (which is not shown) stored in the signal conditioning unit 23. Amplitude and phase correction may, of course, likewise be carried out on the already digitized signals SIN and COS.

In addition, the resolution of the digitized input signals SIN and COS can be increased in comparison to the resolution of the A/D converters by means of a fast digital filter implemented in the signal conditioning unit 23, thus also allowing the quantization noise and other disturbances to be reduced.

The error-corrected and regulated digital intermediate signals SINd and COSd are passed from the signal conditioning unit 23 to a calculation unit 30.

In the calculation unit 30, the two signals SINd and COSd are used to produce a position signal POS, which reflects the position of the scale subdivision 4 against time. During a movement of the scale subdivision 4 relative to the signal generation unit 7 at a constant speed, that is to say with a linear position change, the position signal is ideally a straight line, whose gradient corresponds to the movement speed.

Instead of a continuous position curve, a periodic position signal POS is preferably formed from the input signals SIN and COS in order to make it simple to calculate the position and to better exhaust the limited range of values of the digital numerical values. For movement at a constant speed, a periodic position signal POS such as this is essentially a sawtooth waveform with one oblique edge and one vertical edge.

The period duration of the position signal corresponds to the period of the SIN and COS signal, and the rise in the oblique branch of the position signal POS corresponds to the rate of movement of the scale subdivision 4 relative to the signal generation unit 7.

The position signal POS can be formed in a simple manner by formation of the arctan (atan) from the quotient of the SINd and COSd signals. Thus:

$$POS = a\tan(SINd/COSd) \qquad (2).$$

By way of example, the arctan of the quotient SINd/COSd can be calculated using a look-up table, or using the CORDIC algorithm.

The position signal POS is calculated with an accuracy of i bits, and is updated at very short time intervals, for example every microsecond. After it has been calculated, the digital position signal POS is passed to the digital filter 13.

The digital filter 13 operates at a high clock frequency, for example 1 MHz. The digital filter 13 reduces noise components and higher-frequency error components in the position word POS, and at the same time improves the resolution of the position word POS from i to k bits of the corrected, high-resolution position word POS'. The delay caused by the filtering process is compensated for by means of a correction value which is dependent on the previous signal history of the position signal POS and is added to the filtered position value. In particular, the correction value may be determined from the previously measured speed of movement, which can easily be calculated from one or more position values POS' determined with a time separation.

The digital filter 13 may use different filter algorithms individually or in combination.

High-frequency noise components can thus be formed by forming a sliding mean value of q successive values of the position signal POS. In this refinement, the digital filter 13 acts as a low-pass filter. In this case, care must be taken to ensure that the digital filter 13 does not filter out any frequencies from the position signal POS which carry information, that is to say which are relevant for the subsequent open-loop or closed-loop control process.

In addition, the digital filter 13 can filter out errors which are dependent on the signal transmitter. For this purpose, typical error curves of known position measurement systems may be determined experimentally in advance, and may be stored in the digital filter 13. One such error curve is illustrated schematically as ERR in the form of an error characteristic in FIG. 3. The errors in the position signal POS which are dependent on the signal transmitter can then be compensated for by multiplication in the frequency domain by a transfer function which is stored in advance in the digital filter 13. Alternatively or additionally, the error curves can also be stored as time series or frequency curves, which are continuously compared in the digital filter with the profile or the frequency content of the position signal POS. A predetermined error compensation process can then be carried out for a predetermined level of match between the position signal POS and the stored error curve.

The position finding unit 20 allows the quality of the input signals to be improved to such an extent that the improved resolution of the position word with k bits can be fully exploited.

The invention claimed is:

1. A method for measuring the position of an object, the steps of said method comprising: calculating a first digital position signal (POS) which represents a position measured by a position sensor from an input sine signal (SIN) and an input cosine signal (COS) produced by the position sensor; digitally filtering said first position signal for forming a second digital position signal (POS') having a resolution (k)

which is higher than that of said first digital position signal (POS); producing an output sine signal (SIN') and an output cosine signal (COS') as a function of the second digital position signal (POS'), the input signals (SIN, COS) having signal periods ($f_p'$) which are multiples of the signal periods ($f_p''$) of the output signals (SIN', COS') respectively, such that the frequency of the output signals (SIN', COS') is increased relative to the frequency of the input signals (SIN, COS), respectively; and filtering out position signal errors which are typical of the signal transmitter by using stored error curves (ERR) which are dependent on the signal transmitter.

2. The method as claimed in claim 1, further including the step of filtering the position signal through a low pass filter.

3. The method as claimed in claim 1, further including the step of filtering the position signal by forming a sliding mean value.

4. The method as claimed in claim 1, further including the step of calculating the position signal (POS) from the arctan (atan) essentially of the quotient from the input sine signal (SIN) and the input cosine signal (COS).

5. The method as claimed in claim 1, further including the step of error-correcting the input sine signal (SIN) and the input cosine signal (COS) before calculating the position signal (POS).

6. The method as claimed in claim 5, further including the step of compensating for different amplitudes of the input sine signal (SIN) and of the input cosine signal (COS) in the step of error-correcting.

7. The method as claimed in claim 5, further including the step of regulating out discrepancies between the offset in the input sine signal (SIN) and/or the input cosine signal (COS) and a nominal offset during the step of error-correcting.

8. The method as claimed in claim 5, further including the step of correcting the phase errors in the input sine signal (SIN) and/or the input cosine signal (COS) during the step of error-correcting.

9. The method as claimed in claim 5, further including the step of calculating the correction values which are used to correct the errors in the input sine signal (SIN) and/or in the input cosine signal (COS) from the input sine signal (SIN) and/or the input cosine signal (COS) themselves or itself.

10. The method as claimed in claim 6, further including the step of regulating out discrepancies between the offset in the input sine signal (SIN) and/or the input cosine signal (COS) and a nominal offset during the step of error-correcting.

11. The method as claimed in claim 1, further including the step of producing the position signal (POS, POS', POS") in the form of an essentially periodically varying, digital numerical value from k bits, which form a word element (m word) is read from m successive bits.

12. The method as claimed in claim 11, further including the step of using the m word for addressing at least one output table (16a, 16b) for producing the output signals (SIN',COS').

13. The method as claimed in claim 11, further including the step of shifting the position ($k_m$) of the m word within the k word by means of a read unit (15), for changing the frequency of the output signals (SIN', COS').

14. The method as claimed in claim 12, further including the steps of using two output tables (16a, 16b), and associating, respectively, the two output tables with the output sine signal (SIN') and the output cosine signal (COS').

15. The method as claimed in claim 12, further including the step of shifting the position ($k_m$) of the m word within the k word by means of a read unit (15), for changing the frequency of the output signals (SIN', COS').

16. The method as claimed in claim 1, further including the step of increasing the frequency of the input signals (SIN, COS) by an integer factor.

17. The method as claimed in claim 1, further including the step of increasing the frequency of the input signals (SIN, COS) by the factor $2^{k-km}$ in the output signals (SIN', COS').

18. The method as claimed in claim 1, further including the step of reading the output signals (SIN', COS') as a function of the position signal (POS, POS', POS") from at least one output table (16a, 16b) containing digitized values (*(0),. . ., *($2^m-1$)) of a sine function.

19. The method as claimed in claim 1, further including the step of producing the input signals (SIN, COS) from a position or angle measurement system (2).

20. The method as claimed in claim 1, further including the step of matching the quadrant position of a reference signal (REF) relative to the input signals (SIN, COS) to the output signals (SIN', COS').

21. The method as claimed in claim 1, further including the step of compensating for the time delay that occurs as a result of the digital filtering of the position signal.

22. A position measurement system (1) for processing of signals (SIN, COS, REF) from a position sensor (7) with an input interface (21) to which an input sine signal (SIN) and an input cosine signal (COS) from the position sensor (7) can be supplied during operation, the position measurement system having a calculation unit (30) by means of which a digital position signal (POS), which represents a position measured by the position sensor, can be produced from the input sine signal (SIN) and the input cosine signal (COS); a signal generation unit (16), by means of which an output sine signal (SIN') and an output cosine signal (COS') can be produced as a function of the position signal (POS), said input sine signal (SIN) and said input cosine signal (COS) each having signal periods which are multiples of the output signals (SIN') and the output cosine signal (COS') periods, respectively; and a digital filter (13) arranged between the calculation unit (30) and a register (14), wherein the position signal (POS) has a resolution of i bits upstream of the digital filter, and has a resolution of k bits downstream from the digital filter, where k>i.

23. The system as claimed in claim 22, wherein said register (14) is provided in which the atan value can be stored as a k word with a resolution of k bits, and an addressing unit is provided, by means of which an m word comprising m successive bits where m<k can be read from the k word.

24. The system as claimed in claim 23, wherein a signal conditioning device (23) is arranged between the calculation unit (30) and the input interface (21), by means of which the signal errors in the input sine signal (SIN) can be corrected using the input cosine signal (COS).

25. The system as claimed in claim 22, wherein a signal conditioning device (23) is arranged between the calculation unit (30) and the input interface (21), by means of which the signal errors in the input sine signal (SIN) can be corrected using the input cosine signal (COS).

26. The system as claimed in claim 22, wherein errors which are dependent on the signal transmitter can be filtered out of the position signal (POS) by said digital filter (13).

27. The system as claimed in claim 26, wherein a signal conditioning unit (23) is arranged before the calculation unit (30), said signal conditioning unit (23) adapted to calculate and correct discrepancies from the manual states of the input sine signal (SIN) and the input cosine signal (COS).

28. The system as claimed in claim 22, wherein the digital filter (13) is essentially in the form of a low-pass filter.

29. The system as claimed in claim 22, wherein the system has a position measurement means (2), by means of which the input signals (SIN, COS) can be produced as signals which represent the movement of a measurement means.

30. The system as claimed in claim 22, wherein a unit (19) is provided for synthesizing a reference signal (REF), said synthesized reference signal being matched to the output sine signal (SIN') and the output cosine signal (COS').

31. The system as claimed in claim 22, wherein compensation units (24a, 24b) are provided before the calculation unit (30), said compensation units (24a, 24b) adapted to correct discrepancies in the input sine signal (SIN) and input cosine signal (COS) from their numerical value.

32. A method for measuring the position of an object, the steps of said method comprising: calculating a digital position signal (POS, POS', POS") which represents a position measured by a position sensor from an input sine signal (SIN) and an input cosine signal (COS) produced by the position sensor; producing an output sine signal (SIN') and an output cosine signal (COS') as a function of the digital position signal (POS, POS', POS"), the signal periods ($f_p'$) of the input signals (SIN, COS) being multiples of the signal periods ($f_p''$) of the output signals (SIN', COS'), respectively; error-correcting the input signal (SIN) and the input cosine signal (COS) before calculating the position signal (POS); and correcting the phase errors in the input sine signal (SIN) and/or the input cosine signal (COS) during the step of error-correcting.

33. The method as claimed in claim 32, further including the step of compensating for different amplitudes of the input sine signal (SIN) and of the input cosine signal (COS) in the step of error-correcting.

34. The method as claimed in claim 32, further including the step of regulating out discrepancies between the offset in the input sine signal (SIN) and/or the input cosine signal (COS) and a nominal offset during the step of error-correcting.

35. The method as claimed in claim 32, further including the step of calculating the correction values which are used to correct the errors in the input sine signal (SIN) and/or in the input cosine signal (COS) from the input sine signal (SIN) and/or from the input cosine signal (COS) themselves or itself.

36. The method as claimed in claim 32, further including the step of producing the position signal (POS, POS', POS") in the form of an essentially periodically varying, digital numerical value from k bits, from which a word element (m word) is read from m successive bits.

37. The method as claimed in claim 32, further including the step of using the m word for addressing at least one output table (16a, 16b) for producing the output signals (SIN', COS').

38. The method as claimed in claim 32, further including the step of shifting the position ($k_m$) of the m word within the k word by means of a read unit (15), for changing the frequency of the output signals (SIN', COS').

39. The method as claimed in claim 32, further including the step of increasing the frequency of the input signals (SIN, COS) by the factor $2^{k-km}$ in the output signals (SIN', COS').

40. The method as claimed in claim 32, further including the step of reading the output signals (SIN', COS') as a function of the position signal (POS, POS', POS") from at least one output table (16a, 16b) containing digitized values (*(0), . . . , *($2^m$–1)) of a sine function.

41. The method as claimed in claim 32, further including the step of matching the quadrant position of a reference signal (REF) relative to the input signals (SIN, COS) to the output signals (SIN', COS').

42. A method for measuring the position of an object, the steps of said method comprising: calculating a digital position signal (POS, POS', POS"), which represents a position measured by a position sensor, from an input sine signal (SIN) and an input cosine signal (COS) produced by the position sensor; producing an output sine signal (SIN') and an output cosine signal (COS') as a function of the digital position signal (POS, POS', POS"), the signal periods ($f_p'$) of the input signals (SIN, COS) being multiples of the signal periods ($f_p''$) of the output signals (SIN', COS'); and matching the quadrant position of a reference signal (REF) relative to the input signals (SIN, COS) to the output signals (SIN', COS').

43. The method as claimed in claim 42, further including the step of matching the phase angle and the pulse duration of the reference signal to the increased umber of signal periods in the output signals (SIN', COS').

44. The method as claimed in claim 42, further including the step of newly synthesizing the reference signal (REF).

45. A position measurement system (1) for processing of signals (SIN, COS, REF) from a position sensor (7) with an input interface (21) to which an input sine signal (SIN) and an input cosine signal (COS) from a position sensor (7) can be supplied during operation, the position measurement system having a calculation unit (30) by means of which a digital position signal (POS, POS', POS"), which represents a position measured by the position sensor, can be produced from the input sine signal (SIN) and the output cosine signal (COS'); a signal generation unit (16), by means of which an output sine signal (SIN') and an output cosine signal (COS') can be produced as a function of the position signal (POS), respectively, the signal periods of said input signals (SIN, COS) being multiples of the signal periods of said output signals (SIN', COS'), respectively; and a signal conditioning unit (23) arranged before the calculation unit (30), said signal conditioning unit (23) adapted to calculate and correct discrepancies from the nominal states of the input sine signal (SIN) and the input cosine signal (COS).

46. The system as claimed in claim 45, wherein the signal conditioning unit (23) comprises a feedback loop by means of which the calculated discrepancies can be fed back to the input sine signal (SIN) and the input cosine (COS).

47. The system as claimed in claim 45, wherein a register (14) is provided in which the atan value can be stored as a k word with a resolution of k bits, and an addressing unit is provided, by means of which an m word comprising m successive bits where m<k can be read from the k word.

48. The system as claimed in claim 45, wherein a signal conditioning device (23) is arranged between the calculation unit (30) and the input interface (21), said signal conditioning device (23) adapted to correct signal errors in the input sine signal (SIN) using the input cosine signal (COS).

* * * * *